United States Patent Office 2,827,524
Patented Mar. 18, 1958

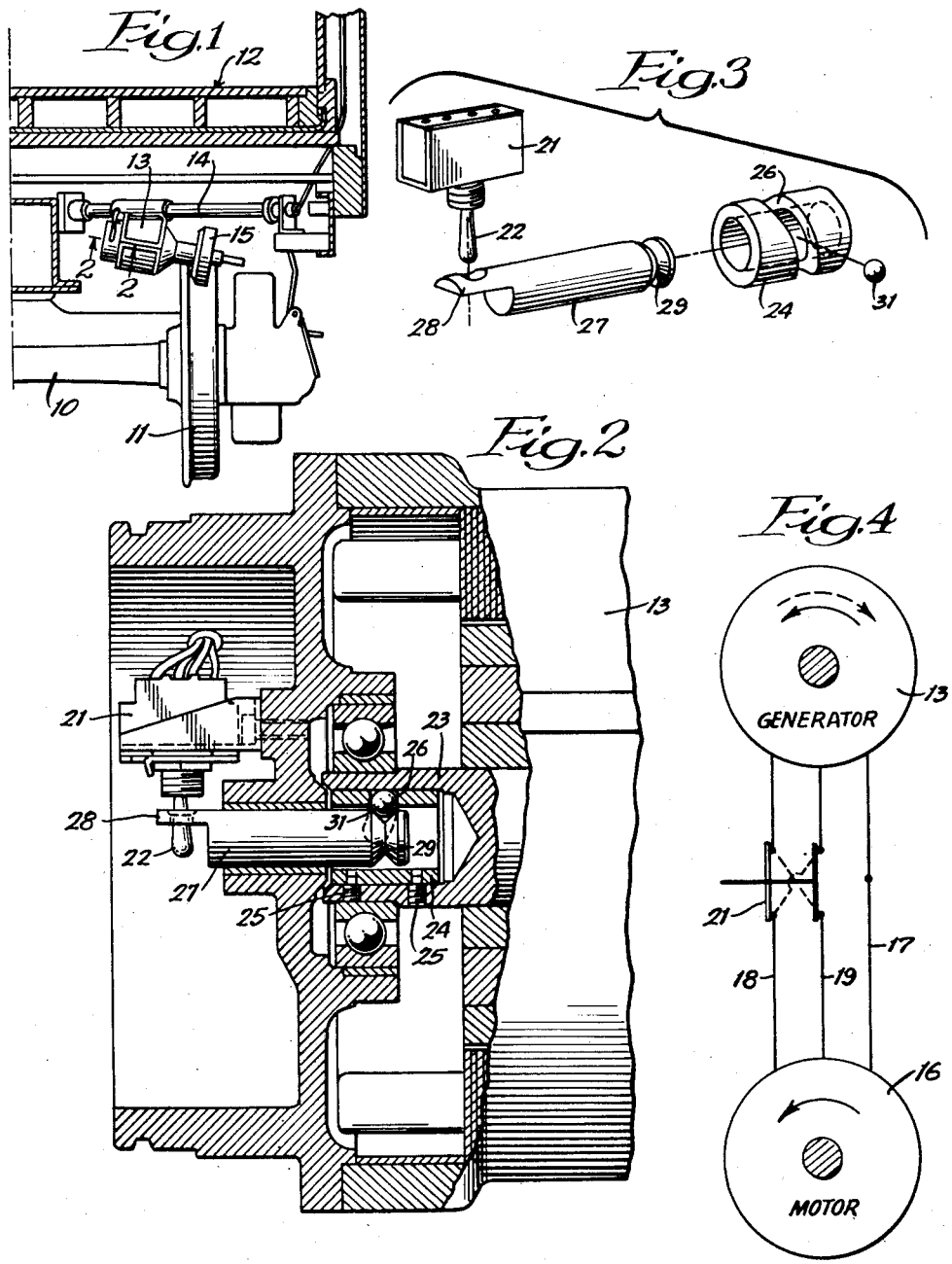

2,827,524

SWITCH ACTUATOR

Robert Joseph Jauch and Christian W. Kruckeberg, Fort Wayne, Ind., assignors to Union Asbestos & Rubber Company, Chicago, Ill., a corporation of Illinois Application November 13, 1956, Serial No. 621,766

4 Claims. (Cl. 200—61.39)

This invention relates to switch actuators and more particularly to an actuating mechanism for use with a reversible generator to operate a switch upon a reversal in direction of rotation of the generator.

Fans and similar accessories on railway cars have commonly been driven by polyphase electric motors supplied with current from a permanent magnet generator driven by the wheels of a car. To prevent reversal of direction of the motor each time the direction of travel of the car is reversed, it has been necessary to provide switch means to change the phase of the current supplied by the generator and it is a general object of the present invention to provide a switch actuator for this purpose.

A specific object of the invention is to provide a switch actuator which is purely mechanical and which functions positively and rapidly to operate the switch upon each reversal in the direction of travel of the generator.

Another object is to provide a switch actuator in which friction drag is minimized or substantially eliminated during generator operation to save energy and to minimize wear of the parts.

According to one feature of the invention; the actuator is formed by a relatively rotatable sleeve and rod formed with cam grooves in which a coupling element, such as a ball, is movable to shift the sleeve and rod axially relative to each other upon reversal in the direction of relative rotation thereof. Preferably the sleeve is driven by the generator and is formed with a cam groove in which the ball fits so that the ball normally turns with the sleeve and is held out of engagement with the rod by centrifugal force during normal operation.

The above and other objects and features of the invention will be more readily apparent from the following description when read in connection with the accompanying drawing, in which:

Figure 1 is a partial sectional view of a railway car provided with a generator equipped with a switch embodying the invention;

Figure 2 is a partial enlarged section of the generator illustrating the switch actuator of the invention;

Figure 3 is a disassembled perspective view of the switch actuator parts; and

Figure 4 is a wiring diagram.

As shown in Figure 1, a conventional railway car comprising an axle 10 carrying a wheel 11 and supporting a car body, indicated generally at 12, is provided with an electric generator 13 to supply current for driving fans or other accessories in the car. As shown, the generator is supported on a pivot rod 14 extending at an acute angle to the transverse dimension of the car above one of the wheels 11. The generator carries a driving roller 15 which bears upon the upper surface of the wheel to be turned thereby as the car travels so that the generator will be rotated.

In a conventional construction, the generator is of the permanent magnet, polyphase type to supply polyphase current to the motors for driving the fans or other accessories in the car. With this type of construction, when the car is traveling in one direction, the generator will turn in one direction to provide one phase relationship and when the car is traveling in the opposite direction the phase relationship will be reversed so that the motors driving fans or other accessories in the car will tend to turn the opposite direction.

To maintain the motors turning in the same direction, a switch is provided, as illustrated diagrammatically in Figure 4, between the generator 13 and a motor 16 in the car. As shown in this figure, the generator and motor are connected by a neutral wire 17 and by two leads 18 and 19 for carrying two different phases of the polyphase current. A switch indicated generally at 21 is provided in the leads 18 and 19 which is movable from the solid line position shown to the dotted line position shown to reverse the phases between the generator and motor. When the switch is in the full line position, one phase of the generator current will pass directly through the lead 18 and another phase will pass directly through the lead 19 so that the motor will be turned in the direction of the arrow indicated when the generator is turning in the direction of the solid arrow. When the direction of the generator is reversed and it is turning in the direction of the dotted arrow, the switch 21 will be reversed to the dotted position shown. At this time, the first phase is transmitted from the generator through the lead 19 and is transferred by the switch to the lead 18 at the motor with the second phase being reversed from the lead 18 at the generator to the lead 19 at the motor so that the motor will continue to turn in the same direction.

The switch 21, as shown in Figures 2 and 3, is a standard snap action reversing switch having a handle 22 swingable from one side to the other to effect the reversal. Preferably the switch is a snap action unit which will tend to remain in one extreme position or the other and will only momentarily occupy the center position shown in the drawings.

To actuate the swtich the switch actuator of the invention is provided which is operated directly from the generator shaft, as shown at 23. The generator shaft 23 is preferably bored out at one end to receive a sleeve 24 which is rigidly secured in the generator shaft by fastenings 25. The sleeve is formed with a helical groove 26 extending partially around its circumference, preferably on the order of about 180°.

A rod 27 fits slidably and rotatably into the sleeve and is formed at one end with a flattened portion 28 provided with an opening therethrough to receive the switch operating handle 22. Adjacent to its opposite end the rod is formed with an annular groove 29 to register with the groove 26 in the sleeve 24.

The sleeve and rod are connected by a coupling element shown as a ball 31 which fits loosely in the groove 26 and in the annular groove 29 in the rod. Outward movement of the ball in the groove 26 is limited so that it will at all times lie within the groove 29, but the ball preferably fits loosely into the grooves so that it can move outward out of engagement with the sides of the groove 29.

In operation, the sleeve 24 turns with the generator shaft while the rod 27 is held against rotation by the switch handle 22 projecting through the opening in the extension 28 thereon. With the generator shaft turning, for example, in a clockwise direction, as seen from the left in Figure 2, the coupling ball 31 will ride around counterclockwise in the groove 26 in the sleeve 24 until it engages the end of the groove after which the ball will continue to turn with the sleeve. Movement of the coupling ball in a counter-clockwise direction relative to the sleeve will shift the rod 26 to the left, as seen in Figure 2, to move the switch to one of its operating positions and the switch will be held in such position by the snap acting spring in the switch. As the generator continues to rotate at relatively high speed the coupling ball will move outward in the groove 26 to the maximum permissible extent at which time it is out of physical contact with the sides of the groove 29 in the rod. There will therefore be no friction and no wearing of the parts as the generator shaft continues to turn. Upon rotation of the generator shaft in the opposite direction, the rod 26 will be shifted to the right, as seen in Figure 2, to reverse the switch 21 and upon continued rotation the ball will again move out away from the sides of the groove 29 to eliminate the friction.

While one embodiment of the invention has been shown and described herein, it will be understood that it is illustrative only and not to be taken as a definition of the scope of the invention, reference being had for this purpose to the appended claims.

What is claimed is:

1. A switch actuator for a reversible generator comprising a pair of coaxial relatively rotatable and axially movable cam members, means to connect one of the members to the generator to rotate therewith, means to hold the other of the members against rotation, one of the cam members having a limited spiral cam track thereon and the other having an annular cam track normal to its axis, a coupling element slidably engaging both of the cam tracks to move from end to end of the spiral cam track as the direction of rotation of the generator reverses thereby to shift said other of the members axially, and a switch connected to said other of the members to be operated by axial shifting thereof.

2. The construction of claim 1 in which one of the cam members is a cylindrical sleeve and the other is a cylindrical rod fitting into the sleeve.

3. A switch actuator for a reversible generator comprising a cylindrical sleeve connected to the generator for rotation therewith and formed in its wall with a helical groove of limited extent, a cylindrical rod fitting into the sleeve for rotation and axial movement and formed with an annular groove normal to its axis, a ball fitting loosely into both of the grooves to shift the rod axially in the sleeve upon a reversal of the direction of relative rotation therebetween, means to limit rotation of the rod, and a switch connected to the rod to be operated by axial movement thereof.

4. A switch actuator for a reversible generator comprising a cylindrical sleeve connected to the generator for rotation therewith and formed in its wall with a helical groove of limited extent, a cylindrical rod fitting into the sleeve for rotation and axial movement and formed with an annular groove normal to its axis, a ball fitting loosely into both of the grooves to shift the rod axially in the sleeve upon a reversal of the direction of relative rotation therebetween, the rod having a transverse opening therethrough, and a switch having an operating handle generally transverse to the rod extending through the opening to limit rotation of the rod and for operation of the switch by axial movement of the rod.

References Cited in the file of this patent

UNITED STATES PATENTS

| | | |
|---|---|---|
| 771,188 | Thompson | Sept. 27, 1904 |
| 2,406,028 | Myers | Aug. 20, 1946 |